July 13, 1926.
F. RYMARZ
1,592,286
KETTLE LIFTER SUPPORT
Filed Oct. 16, 1925  2 Sheets-Sheet 2
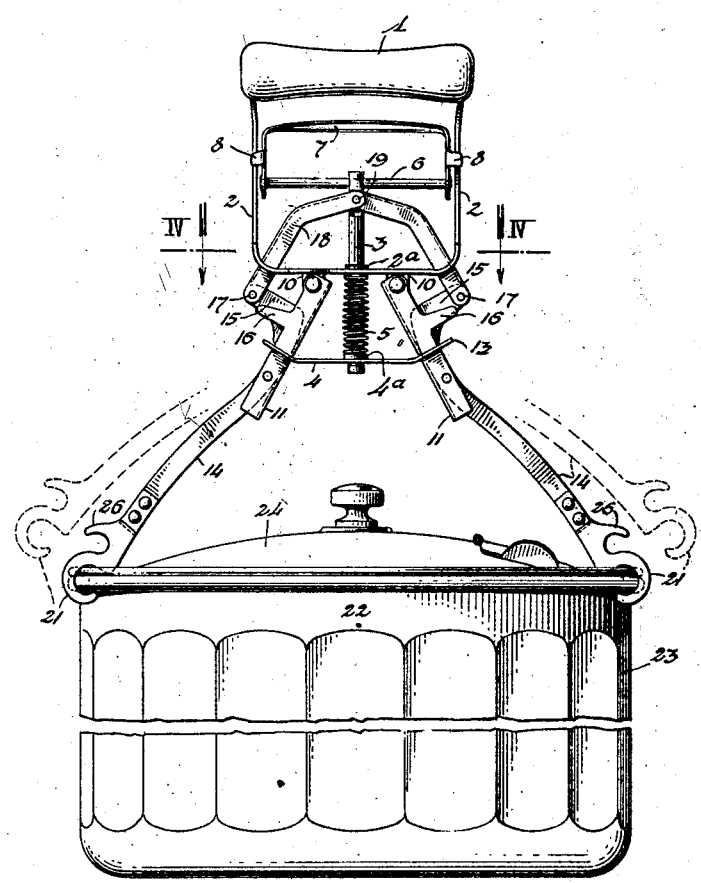
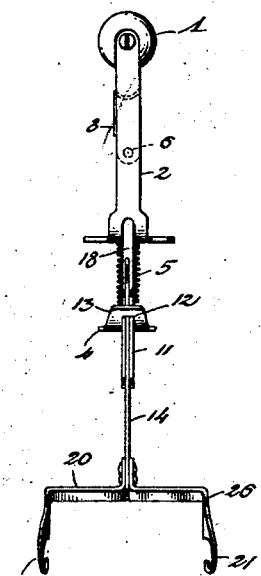
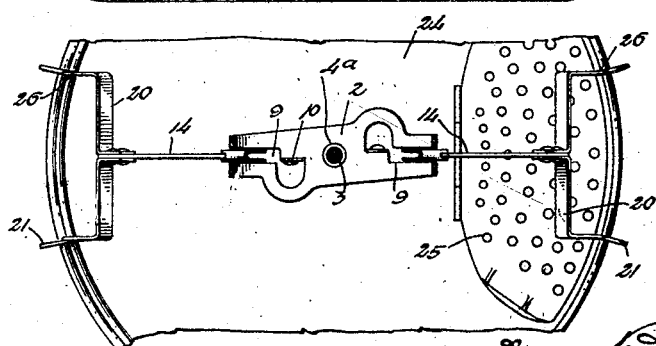
Inventor:
Frank Rymarz Patented July 13, 1926.

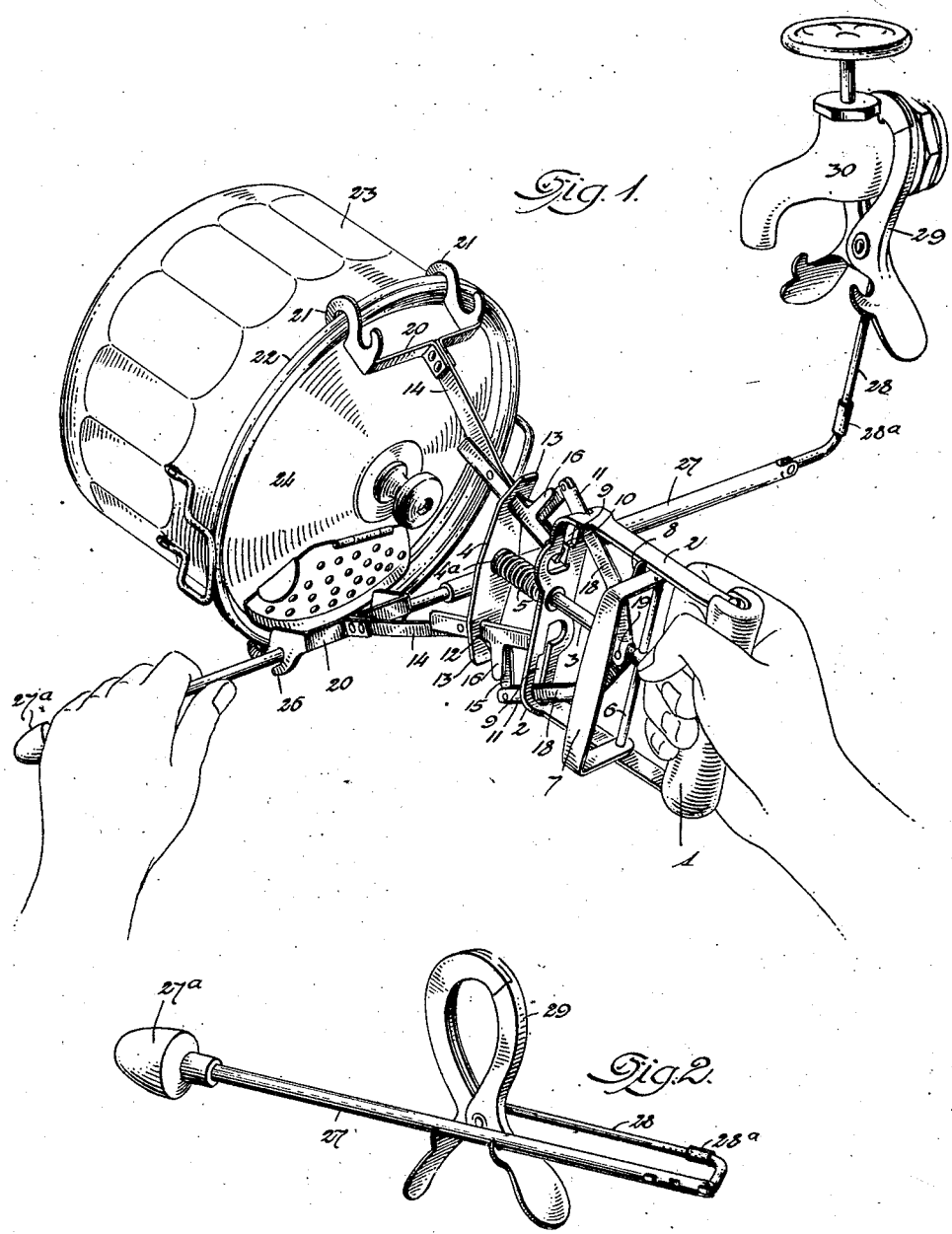

1,592,286

UNITED STATES PATENT OFFICE.

FRANK RYMARZ, OF SPRINGWELLS, MICHIGAN.

KETTLE LIFTER SUPPORT.

Application filed October 16, 1925. Serial No. 62,819.

This invention relates to a kettle lifting device and draining support, and has special reference to a device that may be advantageously used in culinary departments and kitchens for manipulating large kettles, especially those equipped with lids or strainers.

The primary object of my invention is to provide a hand manipulated gripping device by which the rim or chime of a kettle may be gripped and the kettle safely lifted and tilted for straining or pouring purposes. The device has somewhat the formation of tongs insomuch that it has opposed gripping members, and these members are normally held in a retracted position and adapted to be manually distended to fit the chime or rim of a kettle or other receptacle.

Another object of this invention is to provide a device for clamping a lid or strainer on a receptacle so that the receptacle may be tilted and its contents poured or strained. To facilitate this in connection with large kettles or other receptacles a support has been provided that may be attached to a faucet or other member and held in one hand while the kettle or receptacle is tilted on said support for straining or pouring purposes. The lid clamping device has a configuration to fit the support and fulcrum thereon, so that there is no danger of the kettle slipping because of its weight or manipulation by one hand.

A further object of this invention is to provide a kettle lifting device embodying a series of arms and links compactly assembled in connection with a stirrup, bail and other elements, and the device will be hereinafter specifically described and then claimed.

Reference will now be had to the drawings, wherein—

Figure 1 is a perspective view of the kettle receiver and support;

Figure 2 is a perspective view of the support;

Fig. 3 is a front elevation of the kettle lifter;

Fig. 4 is a horizontal sectional view taken on the line IV—IV of Fig. 3, and

Fig. 5 is a side elevation of the kettle lifter.

In the drawings, the reference numeral 1 denotes a handle having a stirrup 2 provided with a bushing $2^a$ and extending through said bushing is a plunger 3 having its lower end mounted in a bushing $4^a$ of a cross head 4. A coiled expansion spring 5 encircles the plunger 3 between the stirrup 2 and the cross head 4, and the expansive force of this spring is adapted to hold the plunger lowered relative to the stirrup.

The upper end of the plunger is provided with a pivot pin 6 for a bail 7 having side lugs 8 adapted to impinge against the stirrup 2 and define a vertical position for the bail under the handle 1, so that the hand gripping the handle can also grip the bail 7 with the fingers extending under the bail and press it towards the handle, thereby raising the plunger 3 relative to the stirrup 2.

The stirrup 2 is slotted, as at 9 and material struck out to provide depending lugs 10. Pivotally connected to the lugs 10 are diverging channel shaped guides 11 which extend through slots 12 in the angularly disposed ends 13 of the cross head 4.

Pivotally mounted in the lower ends of the channel guides 11 are gripping arms 14 which extend upwardly in the pivoted guides 11 and have angular ends 15 movable between side extensions 16 of the guides 11. The upper angular ends of the gripping arms 14 are pivotally connected, as at 17 to links 18 extending through the slots 9 of the stirrup 2, said links converging with the inner ends thereof pivotally connected, as at 19, to the upper end of the plunger 3.

On the lower outer ends of the gripping arms 14 are yokes 20 provided with hook shaped members 21 adapted for gripping the chime or rim 22 of a kettle or other receptacle 23, which may be provided with a lid 24 having a strainer or pouring spout 25. The hook shaped members 21 are adapted to extend on to the lid 24 and retain said lid on the kettle, particularly when the kettle is being tilted by the device, as shown in Fig. 1.

To facilitate this operation the hook shaped members 21 have auxiliary hooks 26 for engagement with a telescopic support 27 having one end thereof pivotally connected to a hanger 28 provided with a clasp or gripping device 29 which may be mounted on a faucet or spigot 30. The hanger 28 may be provided with a sleevelike buffer $28^a$ which may cooperate with a buffer or handle 27ª on the support 27 in supporting the device transversely of a sink, without any danger of the supporting device injuring the same.

The telescopic support 27 is adapted to be held in one hand while the kettle 23 is tilted relative to said support, as shown in Fig. 1. With the auxiliary hooks 26 in engagement with the telescopic or extensible support 27 there is no danger of the kettle and its load slipping. As considerable straining or pouring is done at a sink, the kettle support can be attached to the faucet or spigot above the sink, and the pivoted hanger 28 will permit of the support being collapsed under the spigot when not in use while the clasp 29 will permit of the support being entirely removed and stored away for future use.

Considering the operation of the lifting device, the expansive force of the spring 5 tends to raise the stirrup relative to the cross head 4 and when the device is not in use the upper ends of the links 18 practically engage the stirrup 2 so that the pivoted channel guides 11 are raised in the cross head 4. To place the lifting device on a kettle the bail 7 is pulled towards the handle 1 and as the cross head 4 is raised the lower ends of the pivoted channel guides 11 are spread apart. The links 18 move in synchronism with the cross head 4 and cause the gripping arms 14 to rock in the channel guides 11, whereby the yokes 20 are widely separated. With the yokes held separated the device may be placed down over a kettle and the bail 7 permitted to lower under the influence of the spring 5. The gripping members 21 will be brought towards each other and on to opposite edges of the chime or rim 22. As the gripping members 21 of each yoke are spaced apart, there will be a four-point connection for the device with the kettle, and with the device properly positioned on the kettle it can be tilted with its strainer or pouring spout lowermost as would be necessary when draining off liquid from the kettle, as shown in Fig. 1.

It is also possible to use the lifting device for manipulating the kettle without the lid or cover, and many uses will be found for the device in connection with any receptacle having a chime, rim or body portion that may be gripped by the members 21.

I desire to direct attention to the fact that the telescopic support 27 may have its handle end placed on the side wall of a sink whereby it will be unnecessary to hold it in the hand, furthermore, that there are many receptacles on the rim or edge of which the gripping device may be fulcrumed for tilting a kettle or other receptacle without using the support.

Various parts of the kettle lifter may be cut, stamped and pressed from sheet metal, and while in the drawings there is illustrated a preferred arrangement of these parts, it is to be understood that the same are susceptacle to such changes as are permissible by the appended claims.

What I claim is:—

1. A kettle lifting device comprising a stirrup, a bail in said stirrup, a cross head supported from said bail below said stirrup, a spring supported between said crosshead and said stirrup and holding said cross head normally distended relative to said stirrup, kettle engaging arms articulated with said stirrup and adapted to be spread apart by said cross head, and means extending through said stirrup and connected to said arms and adapted to be operated by said bail for distending said arms preparatory to placing said arms in engagement with a kettle.

2. A kettle lifting device comprising a stirrup provided with a handle, channel guides pivotally connected to said stirrup, kettle engaging arms having the upper ends thereof lying within said guides and pivotally connected thereto and means within said stirrup and extending out of said stirrup for connection with said arms adapted to be manually actuated to shift said arms.

3. A kettle lifting device as called for in claim 2, wherein said means includes a bail and links.

4. A kettle lifting device as called for in claim 2, further characterized by yokes on the outer ends of said kettle engaging arms terminating in hook shaped gripping members adapted to engage a kettle.

5. A kettle lifting device comprising a stirrup provided with a handle, guides pivotally connected to said stirrup, kettle engaging arms pivotally mounted in said guides, a spring pressed cross head through which said guides extend and hold said arms normally retracted, and links connected to said arms and extending into said stirrup adapted to be manually actuated to distend said arms.

6. A kettle lifting device as called for in claim 5, further characterized by a bail in said stirrup operatively connected to said links and pivotally supported to swing in one direction relative to said stirrup.

7. A kettle lifting device comprising hook shaped arms adapted to be clamped on the edges of the kettle, and a support adapted to be engaged by the hook shaped arms to facilitate tilting the kettle relative to the support.

8. A kettle lifting device as called for in claim 7, wherein said support includes a telescopic member having one end thereof provided with a clasp.

9. A kettle lifting device as called for in claim 7, wherein said support is characterized by a faucet engaging clasp, a hanger connected thereto, and a telescopic member pivotally connected to said hanger.

10. A kettle manipulating device comprising kettle engaging arms having a configuration adapted to grip a kettle and retain a lid thereon so that the kettle may be tilted without displacement of said lid, a handle equipped stirrup supporting said arms, means in said stirrup adapted for shifting said arms relative thereto, and a support to be engaged by said arms and held to facilitate tilting said kettle.

In testimony whereof I affix my signature.

FRANK RYMARZ.